UNITED STATES PATENT OFFICE.

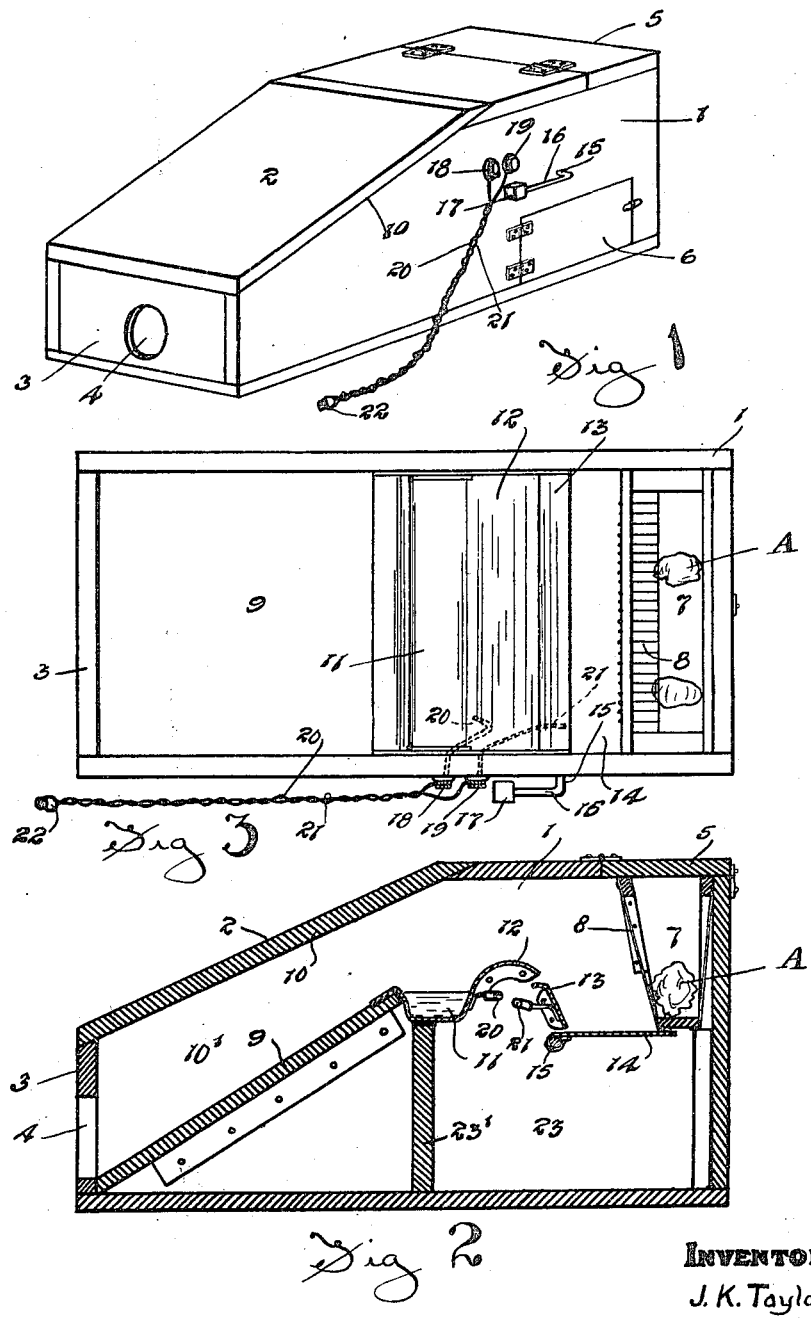

JOHN KENNEY TAYLOR, OF MAHASKA, ALBERTA, CANADA.

ANIMAL-TRAP.

1,281,876.  Specification of Letters Patent.  Patented Oct. 15, 1918.

Application filed March 30, 1918. Serial No. 225,799.

*To all whom it may concern:*

Be it known that I, JOHN KENNEY TAYLOR, of the town of Mahaska, in the Province of Alberta, Canada, have invented certain new and useful Improvements in Animal-Traps, of which the following is the specification.

The invention relates to improvements in animal traps and particularly to a trap for catching animals of the rodent class such as rats, gophers and such like and the object of the invention is to provide a simply constructed, inexpensive and durable trap which will electrocute and kill the animal enticed into it and from which the dead bodies can be readily removed.

A further object is to construct the trap so that the caught animal will not be in view or exposed so that other animals will not be frightened away.

A further object of the invention is to construct the trap so that it is self setting and can catch any number of animals, depending on its capacity.

With the above objects in view the invention consists essentially in the arrangement and construction of parts hereinafter more particularly described and later pointed out in the appended claim, reference being had to the accompanying drawing in which:—

Figure 1 represents a perspective view of the trap.

Fig. 2 represents a longitudinal sectional view through the same.

Fig. 3 represents a plan view with the top removed.

In the drawing like characters of reference indicate corresponding parts in the several figures.

1 represents a box like casing having the front end thereof tapering down as indicated at 2 to a comparatively narrow end 3 in which is placed centrally the entrance opening 4.

The casing is provided with two doors, one a top door 5 and the other a side door 6, such being provided for a purpose later described.

At the back end of the casing and at the top I locate a bait holder or hopper 7 which is arranged so that the food in the hopper is exposed at the front. This is done in the present instance by making the front of the hopper an open frame across which I stretch cross wires 8.

Within the front part of the casing I locate an inclined approach in the nature of a cross partition 9 which in conjunction with the top 10 of the casing provides an inclined passage-way 10' entered through the opening 4.

Here it will be observed that the passage-way contracts slightly toward the top.

Immediately adjoining the upper end of the partition I locate a metallic water pan 11 which is horizontally disposed and suitably supported between the walls of the casing, it being preferable to insulate electrically the pan from the ends of the casing as well as from the upper end of the partition. One side of the water pan is extended into a semi-circular flange 12 and immediately adjoining the free edge of the flange but spaced therefrom I locate a metallic chute 13 inclining downwardly toward the rear end of the casing. This chute is preferably insulated from the ends of the casing.

Adjoining the lower edge of the chute and between the chute and the bait holder I locate a trap door 14 which has the side adjacent the chute permanently secured to a cross rod 15 pivotally mounted in the sides of the casing and provided at one end with an extending crank 16 fitted with a weight 17. The crank extends in a direction such that the weight normally holds the free edge of the trap door engaged with the underside of the bait holder.

The pivoted side of the trap door, that is to say the side carried by the cross rod is spaced from the adjacent edge of the chute.

The water pan and the chute are each electrically connected to binding posts 18 and 19 located at the outer side of the casing and these can be connected to feed wires 20 and 21 attached to a plug 22 so that the wires can be conveniently connected to an ordinary electric socket connected in circuit with the customary main feed wires.

While the electrical connection to the water pan and chute have been herein indicated for conveniently attaching to the socket it will be readily understood that any kind of electrical connection could be utilized without in the least departing from the spirit of the invention in this regard.

Further, while I have shown the pan and the chute as electrically insulated from the rest of the trap, it will be understood that in actual practice this may not be necessary in event of the trap body being made from an insulating material.

In carrying out my invention in its present form it is only necessary to have the pan and the chute insulated from one another and suitable electrical connections made to the pan and the chute.

Between the bottom of the trap and the underside of the water pan I locate a partition 23' which incloses a chamber indicated at 23 in which the dead bodies of the animals caught are collected and from which chamber they can be removed through the door 6.

The top door 5 is to allow of ready entrance to the bait holder and water pan for replenishing the same or cleaning out.

When this device is set up the animal, such as a rat, is enticed into the trap through the opening 4 by the bait indicated at A placed in the holder. He crawls up the passage and crosses the water pan where his feet naturally become wet. In striving to reach the bait he will naturally put his front feet on the chute and in doing so will close the circuit between the pan and the chute with the result that he is immediately electrocuted.

The dead body will, owing to the arrangement of the parts, naturally fall down toward the trap door which will open and allow the body to fall down into the chamber.

The trap door resets under the action of the weight and shuts out any view of the animal so that other animals will not be scared away.

In connection with the water pan, I might here mention that it not only acts to entice the animal but it serves the important function of dampening his feet so that a good electrical connection will be made between the pan and the chute.

The various parts of the trap can obviously be made so that they can be removed if desired.

What I claim as my invention is:—

An animal trap comprising a casing having an entrance opening therein and containing a bait holder, an inclined passageway entered through the opening, a water pan at the top thereof, one side of which extends into a semicircular flange, an inclined chute adjoining the free edge thereof but spaced therefrom, a trap door adjoining the lower edge of the inclined chute and between the said chute and the bait holder and electrocuting means between the water pan and the trap door.

Signed at Winnipeg, this 28 day of February 1918.

JOHN KINNEY TAYLOR.

In the presence of—
  G. S. ROXBURGH,
  K. B. WAKEFIELD.

Copies of this patent may be obtained for five cents each, by addressing the "Commissioner of Patents, Washington, D. C."